(12) United States Patent
Guim Bernat et al.

(10) Patent No.: US 12,019,768 B2
(45) Date of Patent: Jun. 25, 2024

(54) REMOTE POOLED MEMORY DEVICE

(71) Applicant: Intel Corporation, Santa Clara, CA (US)

(72) Inventors: Francesc Guim Bernat, Barcelona (ES); Karthik Kumar, Chandler, AZ (US); Mark Schmisseur, Phoenix, AZ (US); Thomas Willhalm, Sandhausen (DE)

(73) Assignee: Intel Corporation, Santa Clara, CA (US)

( * ) Notice: Subject to any disclaimer, the term of this patent is extended or adjusted under 35 U.S.C. 154(b) by 942 days.

(21) Appl. No.: 16/830,703

(22) Filed: Mar. 26, 2020

(65) Prior Publication Data

US 2020/0226272 A1    Jul. 16, 2020

(51) Int. Cl.
*G06F 21/60* (2013.01)
*G06F 3/06* (2006.01)
*H04W 12/50* (2021.01)

(52) U.S. Cl.
CPC .......... *G06F 21/606* (2013.01); *G06F 3/0604* (2013.01); *G06F 3/0622* (2013.01); *G06F 3/0644* (2013.01); *G06F 3/0659* (2013.01); *G06F 3/0673* (2013.01); *H04W 12/50* (2021.01)

(58) Field of Classification Search
CPC .... G06F 3/0604; G06F 3/0622; G06F 3/0644; G06F 3/0673; G06F 3/0638; G06F 3/067; G06F 21/606
See application file for complete search history.

(56) References Cited

U.S. PATENT DOCUMENTS

| 11,573,839 | B1 * | 2/2023 | Tsai | H04L 67/10 |
| 2015/0293881 | A1 * | 10/2015 | Raikin | H04L 67/02 709/212 |
| 2016/0085450 | A1 * | 3/2016 | Ahn | G06F 3/067 711/154 |
| 2018/0004687 | A1 * | 1/2018 | Guim Bernat | H04L 49/10 |
| 2018/0373671 | A1 * | 12/2018 | Bernat | G06F 12/084 |
| 2019/0042163 | A1 * | 2/2019 | Guim Bernat | G06F 3/0683 |
| 2019/0042783 | A1 * | 2/2019 | Guim Bernat | H04L 9/0894 |

(Continued)

OTHER PUBLICATIONS

Aguilera, M.K., Amit, N., Calciu, I., Deguillard, X., Gandhi, J., Subrahmanyam, P., Suresh, L., Tati, K., Venkatasubramanian, R. and Wei, M., Sep. 2017. Remote memory in the age of fast networks. In Proceedings of the 2017 Symposium on Cloud Computing (pp. 121-127).*

(Continued)

*Primary Examiner* — Tracy A Warren
(74) *Attorney, Agent, or Firm* — Essential Patents Group, LLP (57) ABSTRACT

An embodiment of an electronic apparatus may include one or more substrates, and logic coupled to the one or more substrates, the logic to process memory operation requests from a memory controller, and provide a front end interface to remote pooled memory hosted at a near edge device. An embodiment of another electronic apparatus may include local memory and logic communicatively coupled the local memory, the logic to allocate a range of the local memory as remote pooled memory, and provide a back end interface to the remote pooled memory for memory requests from a far edge device. Other embodiments are disclosed and claimed.

14 Claims, 6 Drawing Sheets

(56) References Cited

U.S. PATENT DOCUMENTS

2020/0371692 A1* 11/2020 Van Doorn ........... G06F 3/0631
2020/0379913 A1* 12/2020 Akel ....................... H04L 67/10

OTHER PUBLICATIONS

Liu, L., Cao, W., Sahin, S., Zhang, Q., Bae, J. and Wu, Y., Jul. 2019. Memory disaggregation: Research problems and opportunities. In 2019 IEEE 39th International Conference on Distributed Computing Systems (ICDCS) (pp. 1664-1673). IEEE.*

* cited by examiner

REMOTE POOLED MEMORY DEVICE

BACKGROUND

Edge computing refers to a distributed computing arrangement which brings computation and data storage closer to the location where it is needed. Some edge computing environments may include a data center, a near edge, and a far edge. The far edge may refer to infrastructure and/or devices which are deployed furthest from the data center and/or closest to the users. The near edge may refer to infrastructure and/or devices which are outside the data center but not at the far edge (e.g., in between the far edge and the data center).

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

NV memory (NVM) may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In particular embodiments, a memory component with non-volatile memory may comply with one or more standards promulgated by the JEDEC, such as JESD218, JESD219, JESD220-1, JESD223B, JESD223-1, or other suitable standard (the JEDEC standards cited herein are available at jedec.org).

Figure 1:
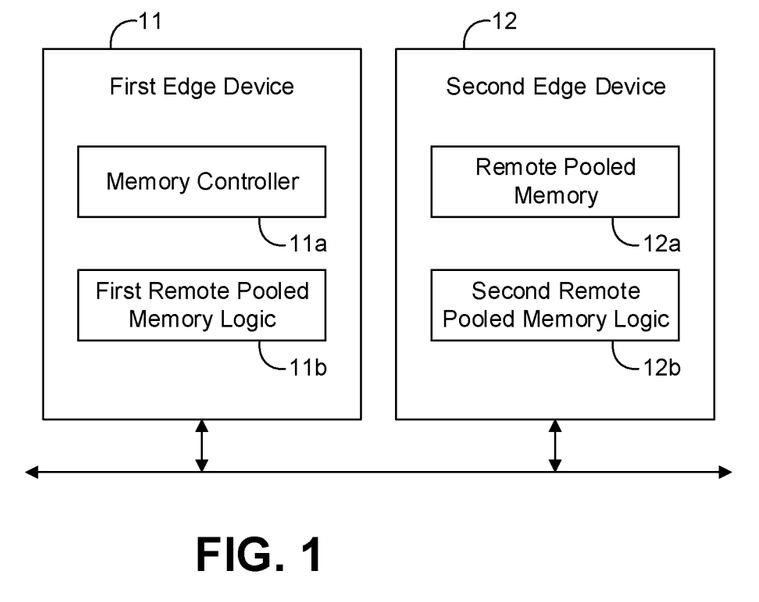
FIG. 1 is a block diagram of an example of an electronic system according to an embodiment.

With reference to FIG. 1, an embodiment of an electronic system 10 may include a first edge device 11 (e.g., a far edge device), and a second edge device 12 (e.g., a near edge device) in communication with the first edge device 11 (e.g., wired or wirelessly). The first edge device 11 may include a first memory controller 11a, and first remote pooled memory logic 11b communicatively coupled to the first memory controller 11a. The first remote pooled memory logic 11b may be configured to process memory operation requests from the first memory controller 11a, and provide a front end interface to remote pooled memory 12a hosted at the second edge device 12. The second edge device 12 may include the remote pooled memory 12a, and second remote pooled memory logic 12b communicatively coupled the remote pooled memory 12a. The second remote pooled memory logic 12b may be configured to provide a back end interface to the remote pooled memory 12a.

In some embodiments, the first remote pooled memory logic 11b may be configured to establish a secure communication link with the second edge device 12, and tunnel memory operations through the secure communication link. The first remote pooled memory logic 11b may also be configured to decode system addresses to map a memory range to the second edge device 12, and/or to encode security credentials of the first edge device 11 in memory requests to the second edge device 12. In some embodiments, the first remote pooled memory logic 11b may be further configured to schedule memory requests to the second edge device 12 based on a quality of service (QoS) policy. The first remote pooled memory logic 11b may also be configured to discover characteristics related to the remote pooled memory 12a including one or more of a memory range associated with the remote pooled memory 12a and a performance characteristic of the remote pooled memory 12a.

In some embodiments, the second remote pooled memory logic 12b may be configured to provide an interface to one or more of allocate, share and delete the remote pooled memory 12a associated with the first edge device 11. The second remote pooled memory logic 12b may also be configured to allocate a range of local memory for the remote pooled memory 12a, and manage memory access requests from the first edge device 11 within the allocated range. For example, the second remote pooled memory logic 12b may be configured to manage memory access requests from a plurality of edge devices within the allocated range. In some embodiments, the second remote pooled memory logic 12b may be further configured to manage a QoS policy for memory access requests from the first edge device 11 within the allocated range, and/or to manage respective QoS policies for memory access requests from a plurality of edge devices within the allocated range.

Embodiments of each of the above first edge device 11, memory controller 11a, first remote pooled memory logic 11b, second edge device 12, remote pooled memory 12a, second remote pooled memory logic 12b, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the memory controller 11a may include a general purpose controller, a special purpose controller, a microcontroller, a general purpose processor, a special purpose processor, a central processor unit (CPU), an execution unit, etc. In some embodiments, first remote pooled memory logic 11b, and/or system memory may be located in, or co-located with, various components, including the memory controller 11a (e.g., on a same die).

Alternatively, or additionally, all or portions of various system components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, persistent storage media or other system memory may store a set of instructions which when executed by a processor or controller cause the system 10 to implement one or more components, features, or aspects of the system 10 (e.g., the first remote pooled memory logic 11b, providing the front end interface to the remote pooled memory 12a hosted at the second edge device 12, the second remote pooled memory logic 12b, providing the back end interface to the remote pooled memory 12a, etc.).

Figure 2:
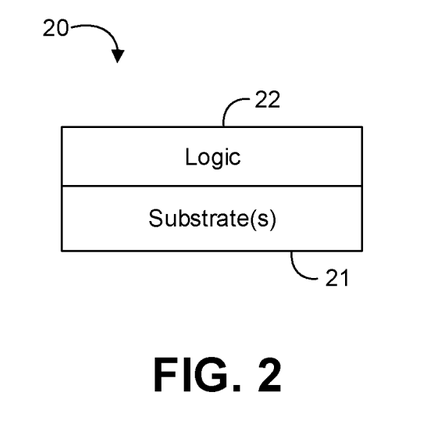
FIG. 2 is a block diagram of an example of an electronic apparatus according to an embodiment.

Turning now to FIG. 2, an embodiment of an electronic apparatus 20 (e.g., a far edge device) may include one or more substrates 21, and logic 22 coupled to the one or more substrates 21. The logic 22 may be configured to process memory operation requests from a memory controller, and provide a front end interface to remote pooled memory hosted at a near edge device. In some embodiments, the logic 22 may be configured to establish a secure communication link with the near edge device, and tunnel memory operations through the secure communication link. The logic 22 may also be configured to decode system addresses to map a memory range to the near edge device, and/or to encode security credentials in memory requests to the near edge device. In some embodiments, the logic 22 may be further configured to schedule memory requests to the near edge device based on a QoS policy. In some embodiments, the logic 22 may be further configured to discover characteristics related to the remote pooled memory including one or more of a memory range associated with the remote pooled memory and a performance characteristic of the remote pooled memory.

Embodiments of the logic 22 may be implemented in a system, apparatus, computer, device, etc., for example, such as those described herein. More particularly, hardware implementations of the logic 22 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the logic 22 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the logic 22 may be implemented on a semiconductor apparatus, which may include the one or more substrates 21, with the logic 22 coupled to the one or more substrates 21. In some embodiments, the logic 22 may be at least partly implemented in one or more of configurable logic and fixed-functionality hardware logic on semiconductor substrate(s) (e.g., silicon, sapphire, gallium-arsenide, etc.). For example, the logic 22 may include a transistor array and/or other integrated circuit components coupled to the substrate(s) 21 with transistor channel regions that are positioned within the substrate(s) 21. The interface between the logic 22 and the substrate(s) 21 may not be an abrupt junction. The logic 22 may also be considered to include an epitaxial layer that is grown on an initial wafer of the substrate(s) 21.

Figure 3:
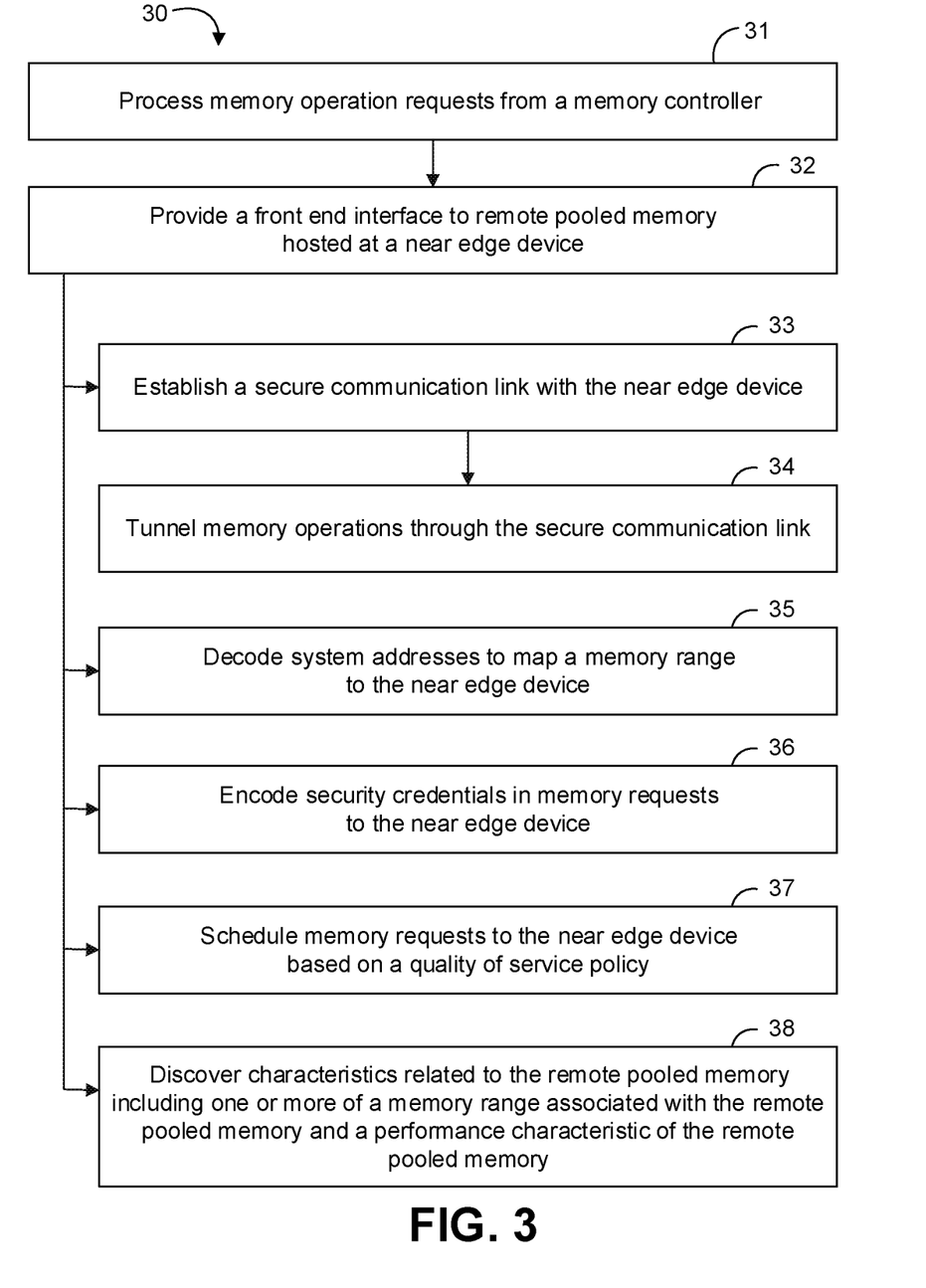
FIG. 3 is a flowchart of an example of a method of controlling memory according to an embodiment.

Turning now to FIG. 3, an embodiment of a method 30 of controlling memory may include processing memory operation requests from a memory controller at block 31, and providing a front end interface to remote pooled memory hosted at a near edge device at block 32. Some embodiments of the method 30 may further include establishing a secure communication link with the near edge device at block 33, and tunneling memory operations through the secure communication link at block 34. The method 30 may also include decoding system addresses to map a memory range to the near edge device at block 35, and/or encoding security credentials in memory requests to the near edge device at block 36. Some embodiments of the method 30 may also include scheduling memory requests to the near edge device based on a quality of service policy at block 37, and/or discovering characteristics related to the remote pooled memory including one or more of a memory range associated with the remote pooled memory and a performance characteristic of the remote pooled memory at block 38.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 31 to 35 below. Embodiments or portions of the method 30 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 4:
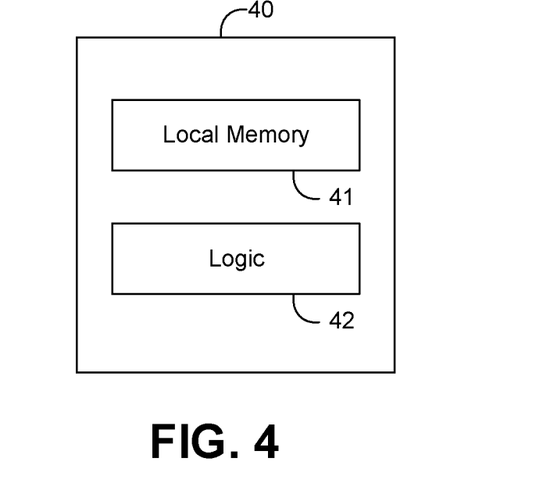
FIG. 4 is a block diagram of another example of an electronic apparatus according to an embodiment.

Turning now to FIG. 4, an embodiment of an electronic apparatus 40 (e.g., a near edge device) may include local memory 41, and logic 42 communicatively coupled the local memory 41. The logic 42 may be configured to allocate a range of the local memory 41 as remote pooled memory, and provide a back end interface to the remote pooled memory for memory requests from a far edge device. In some embodiments, the logic 42 may be further configured to provide an interface to one or more of allocate, share and delete the remote pooled memory associated with the far edge device. The logic 42 may also be configured to manage memory access requests from the far edge device within the allocated range of the local memory 41. For example, the logic 42 may be configured to manage memory access requests from a plurality of far edge devices within the allocated range of the local memory 41, and/or to manage respective QoS policies for memory access requests from a plurality of far edge devices within the allocated range of the local memory 41.

Embodiments of the logic 42 may be implemented in a system, apparatus, computer, device, etc., for example, such as those described herein. More particularly, hardware implementations of the logic 42 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the logic 42 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 5:
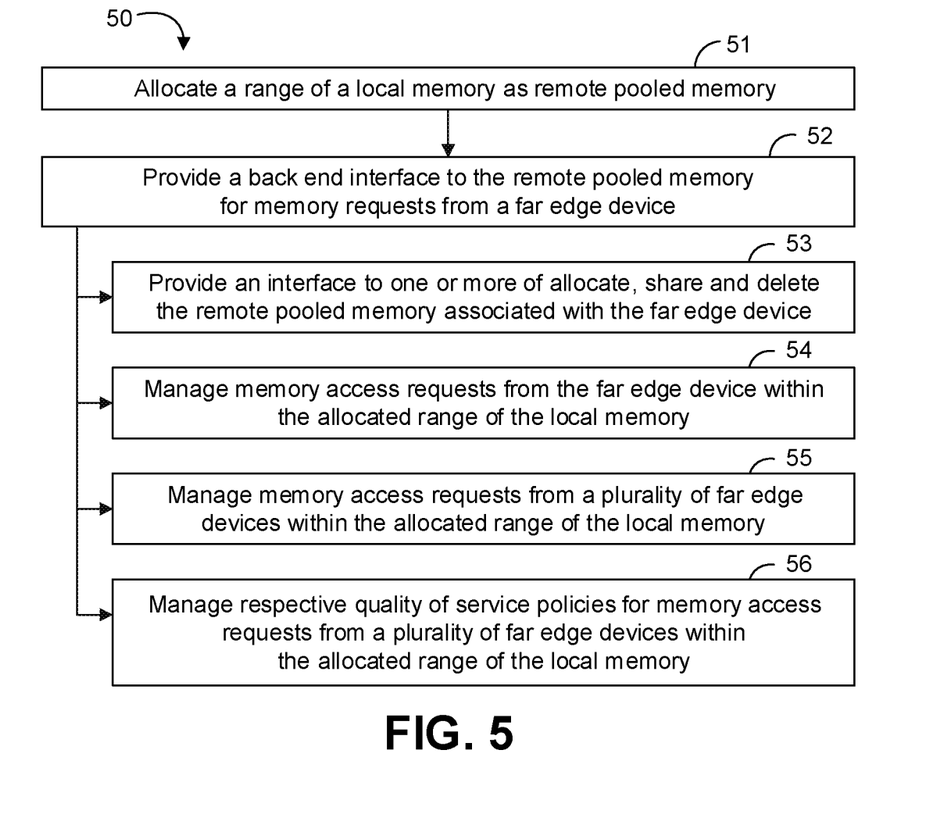
FIG. 5 is a flowchart of another example of a method of controlling memory according to an embodiment.

Turning now to FIG. 5, an embodiment of a method 50 of controlling memory may include allocating a range of a local memory as remote pooled memory at block 51, and providing a back end interface to the remote pooled memory for memory requests from a far edge device at block 52. Some embodiments of the method 50 may further include providing an interface to one or more of allocate, share and delete the remote pooled memory associated with the far edge device at block 53. The method 50 may also include managing memory access requests from the far edge device within the allocated range of the local memory at block 54. For example, the method 50 may include managing memory access requests from a plurality of far edge devices within the allocated range of the local memory at block 55, and/or managing respective quality of service policies for memory access requests from a plurality of far edge devices within the allocated range of the local memory at block 56.

Embodiments of the method 50 may be implemented in a system, apparatus, computer, device, etc., for example, such as those described herein. More particularly, hardware implementations of the method 50 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 50 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 50 may be implemented on a computer readable medium as described in connection with Examples 36 to 40 below. Embodiments or portions of the method 30 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Power requirements may be a significant constraint in an edge computing environment. For example, a server's power and thermal requirements may limited based on their location inside of base stations. Some edge devices may be battery operated or solar powered and may benefit from optimization of power usage. Specifically at the far edge, power and thermal challenges become more significant.

Nonvolatile memory (NVM) such as, for example, NAND-based memory technology offers some advantages for edge computing as compared to volatile memory technology such as, for example, DRAM technology. NVM may provide large capacities at lower costs than DRAM, at DRAM-like speeds, with persistence. Nonvolatile DIMMs (NVDIMMs) may be particularly useful for edge architectures and in-memory architectures, to provide a memory tier with DRAM-like speeds (e.g., replacing DRAM) and a disk tier with disk-like capacities (e.g., replacing hard disk drives and/or other flash memory).

Various problems or challenges may occur, however, for far edge deployments of NVM technology. Power consumption is one of the biggest challenges with persistent memory DIMMs. Larger capacity DIMMs (e.g., 512 GB+) may be power-constrained (e.g., at about 15 W). Managing hundreds, thousands, or more far edge deployments may be more complex as compared to replacing NVDIMMS at a single edge data center (e.g., due to device failure, end of life, upgrade, etc.). Many or a vast majority of far edge deployments may not include any sort of physical security (e.g., a guard, a secure facility, etc.). Some customers may be reluctant to run some services on an edge device which utilizes persistent memory (e.g., even if the device utilizes runtime encryption or other security technologies) because of the risk of theft. A far edge location may be subject to more extreme thermals and ambient conditions, and some memory technologies may be subject to higher amount of failures. Advantageously, some embodiments of remote pooled memory technology may overcome one or more of the foregoing problems. For example, some embodiments may advantageously provide technology for a remote pooled memory device such as a fifth generation wireless technology for digital cellular communication (5G) compatible pooled memory dual inline memory module (DIMM).

In order to overcome one or more of the foregoing problems and enhance deployment of NVM memories to the far and/or near edge, some embodiments may a platform memory technology and/or a DIMM that exposes regular memory operations on the far edge but functions as a front end to a remote pooled memory hosted at the next level of the edge. For example, a remote pooled memory device may tunnel memory operations utilizing either wireless communication (e.g., 5G for Green Edge, satellite, etc.) or wired connectivity (e.g., for a power grid edge).

Some edge architectures may benefit from very low latencies (<1 ms) between the far edge (e.g., where the remote pooled memory device is located) and the near edge (e.g., where the physical pooled memory is placed for access via 5G). Embodiments of the remote pooled memory device (e.g., exposed as a different address space) may add yet another level of memory with different capabilities with respect to the local memory of the far edge device (e.g., higher latency and less bandwidth but with higher reliability, less power and higher security). In some embodiments, the remote pooled memory and the local memory may be utilized as separate pools, or a tiered pool, depending on the use case/application.

Figure 6:
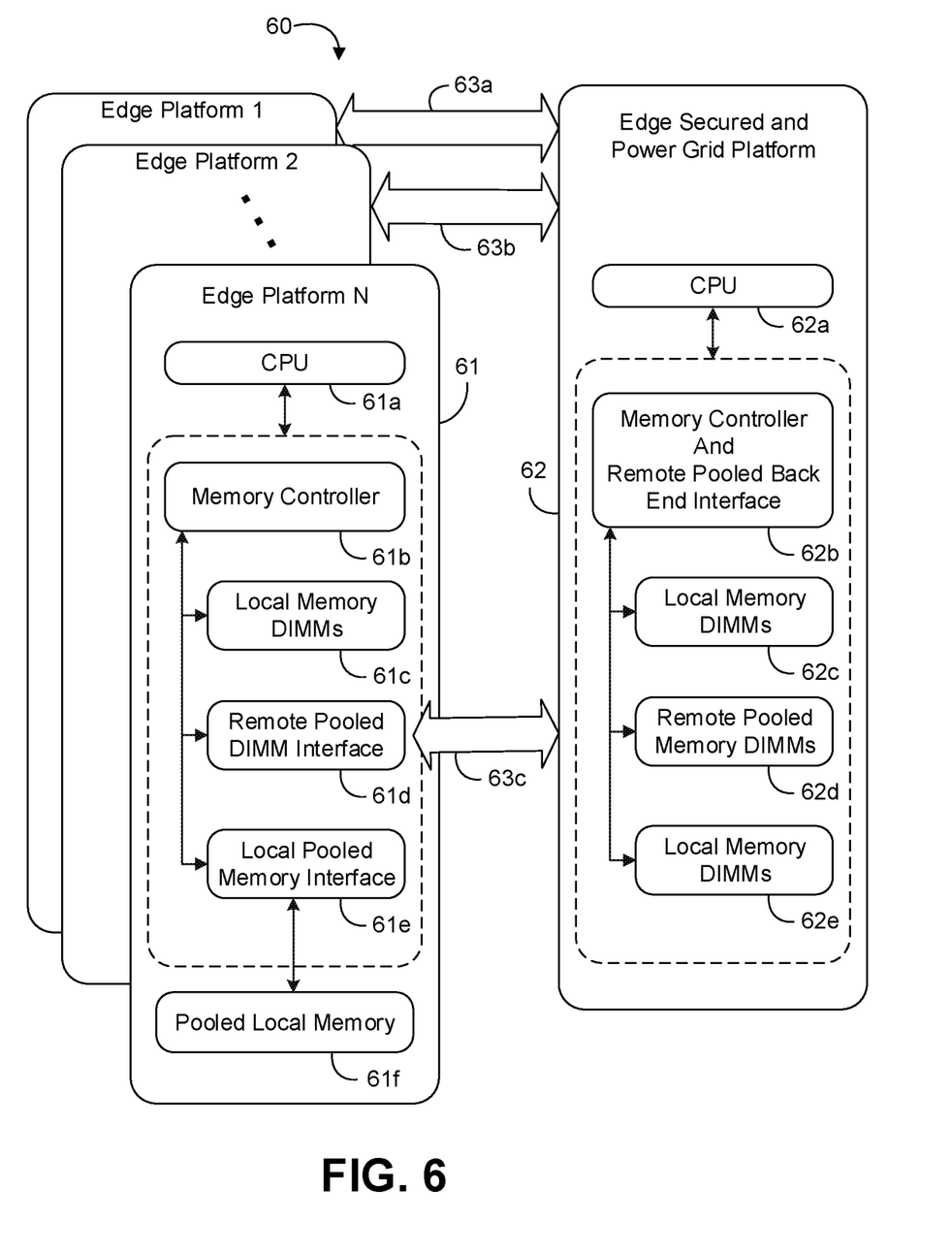
FIG. 6 is a block diagram of an example of an edge computing environment according to an embodiment.

With reference to FIG. 6, an embodiment of an edge computing environment 60 may include one or more edge platforms 61 (e.g., edge platforms 1 through N, where N>0) on the far edge and an edge platform 62 on the near edge. The edge platform 62 may be more secure and may have more reliable power as compared to the edge platforms 61. The edge platforms 61 and 62 may be communicatively coupled to each other over respective secure channels 63a-c. For example, each of the secure channels 63a-c may be a 5G or wired channel which is authenticated with security credentials, keys, encryption, etc., and which provides relatively low latency and high bandwidth. The edge platforms 61 on the far edge may include a CPU 61a, a memory controller 61b, local memory DIMMs 61c, a remote pooled DIMM interface 61d, and a local pooled memory interface 61e to local pooled memory 61f. The remote pooled DIMM interface 61*d* may be a DIMM form factor device or other memory channel logic that acts as front end for physical memory hosted in the next level of the edge (e.g., the edge platform 62). Memory requests at the memory controller 61*b* may be tunneled through a secured channel (e.g., 5G or wired using Compute Express Link (CXL) protocol) to the next level of edge hosting the physical memory. Advantageously, because the next level of edge may be more secure, reliable, and/or manageable, the physical memory may include NVM and benefit from the numerous advantages of NVM. In some embodiments, the remote pooled DIMM interface 61*d* may be implemented or integrated with other components of the edge platform 61 (e.g., the memory controller 61*b*, a CXL switch, etc.).

The edge platforms 62 at the near (e.g., or a data center edge) may include a CPU 62*a*, a memory controller and remote pooled back end interface 62*b*, and local DIMMs 62*c*-*e*, some portion of which are allocated to remote pooled memory DIMMs 62*d*. The back end interface 62*b* may be configured to: (a) provide interfaces for the management edge components to allocate, share and delete memory to one or more far edge platforms 61; (b) manage memory and memory access requests coming from one or multiple far edges to a given range (e.g., a memory address range shared between edge services running on the edge platforms 61); and (c) implement quality of service policies for different far edge tenants accessing the remote pooled memory DIMMs 62*d*.

Figure 7:
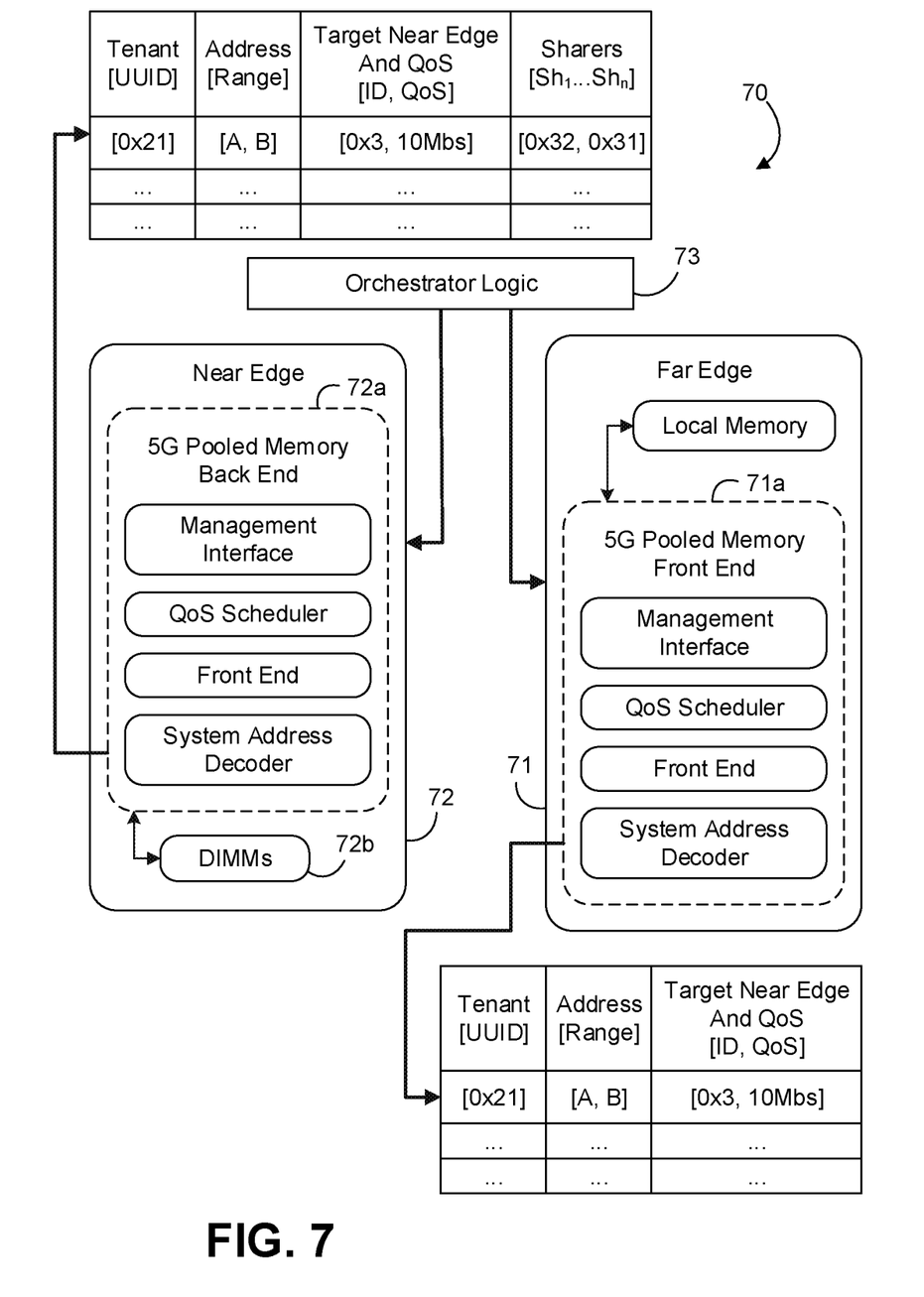
FIG. 7 is a block diagram of another example of an edge computing environment according to an embodiment.

With reference to FIG. 7, an embodiment of an edge computing environment 70 may include a far edge device 71 communicatively coupled to a near edge device 72 via orchestrator logic 73. The far edge device 71 includes a 5G pooled memory front end 71*a* that acts as front end interface for physical memory hosted at the near edge device 72. The 5G pooled memory front end 71*a* may include a management interface, a QoS scheduler, a front end interface, and a system address decoder (SAD). For example, the memory controller, the CPU, or other logic in the far edge device 71 may be configured to specify that a particular memory range is hosted by the pooled memory in the near edge device 72. Any access to that particular range in the far edge device 71 may be tunneled to the 5G pooled memory front end 71*a*. The far edge device 71 may also be configured to discover how much 5G pooled memory is available to the software stack, how many different memory ranges are available (e.g., different memory ranges for different edges with different properties such as latency, bandwidth etc.) and what are the characteristics thereof. For example, the software stack may discover the properties of each of the ranges by accessing specific CPU registers that identify what ranges, the latencies attached to the ranges, whether the ranges are local or remote, and where the range is stored if the range is remote.

Advantageously, the 5G pooled memory front end 71*a* may present itself to the far edge device 71 as a conventional memory device, such that embodiments may be backwards compatible and/or otherwise plug-in compatible with numerous far edge devices. For example, the 5G pooled memory front end 71*a* may expose standard DIMM commands to the memory controller. Internally, the SAD of the 5G pooled memory front end 71*a* may map the different memory ranges to each of the different near edges which may host physical memory. For example, each entry the SAD may include: an address range; an address of the edge device hosting the memory; and credentials of the edge device to send securely the data. The management interface may only be accessible using out of band interfaces that allow the far edge device 71 to configure the various memory ranges and corresponding address decoding.

The front end interface may receive requests from the CPU/memory controller for remote memory pooled over 5G. When a new request arrives: 1) The SAD determines who owns the corresponding memory range (e.g., in case of an error an interrupt may be generated); 2) The QoS Scheduler may determine if the request can be issued to the remote edge location (e.g., if there are other requests with higher priority or the requests needs to be scheduled with the rest of request, other scheduling policies may be applied); and 3) The front end interface will select one request to be sent to the backend, secure the payload using appropriate credentials and commands (e.g., created using CXL protocol), tunnel the selected request to the edge target, wait for the response, and provide the response back to the software stack.

The near edge device 72 includes a 5G pooled memory back end interface 72*a* and DIMMs 72*b*. A portion of the DIMMs 72*b* may be allocated to remote pooled memory for the far edge device 71. The 5G pooled memory back end interface 72*a* may include complementary components/logic for a management interface, a QoS scheduler, a front end interface, and a SAD. The 5G pooled memory back end interface 72*a* may be configured to provide interfaces for the management edge components to allocate, share and delete memory to one or more far edge nodes. The interfaces allow the near edge device to specify a given memory range is shared across a set of edge tenants that are hosted in set of far edges, and a particular quality of services or service level agreements to that memory range or per each of the tenants. The 5G pooled memory back end interface 72*a* may be further configured to manage memory and memory access requests coming from one or multiple far edges to a given range. For example, the 5G pooled memory back end interface 72*a* may be configured to validate that the requestor has rights to that memory range (R, W or R/W), apply the quality of service policy when required, and issue the memory request and send a response back. The 5G pooled memory back end interface 72*a* may also be configured to implement quality of service policies for different far edge tenants accessing the remote pooled memory DIMMs.

Figure 8:
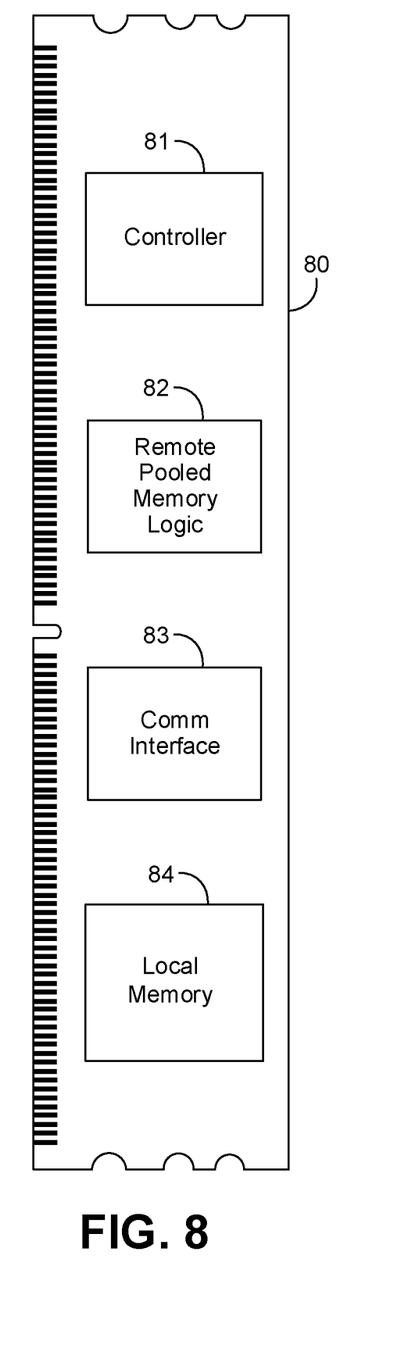
FIG. 8 is a block diagram of an example of a remote pooled memory device with a dual inline memory module (DIMM) form factor according to an embodiment.

With reference to FIG. 8, an embodiment of a remote pooled memory device 80 may have a DIMM form factor, including pins along both sides of a connector edge and components on both sides of the DIMM. The number of pins shown in FIG. 8 is for illustration purposes only, and more or fewer pins may be provided in various embodiments. The particular DIMM form factor shown in FIG. 8 is for illustration purposes only, and other DIMM form factors may be provided in various embodiments. The device 80 may include additional components, circuitry, and logic to present as a DDR-based, standards compliant memory. For example, the device 80 may include, among other things, a controller 81, remote pooled memory logic 82 (e.g., which may be distributed throughout the various components of the device 80), interface component(s) including a communication interface 83, and local memory 84. The location and side of the DIMM for these components as shown in FIG. 8 is for illustration purposes only, and the various illustrated components may be provided in any suitable location on the DIMM in various embodiments.

In an example implementation for a far edge device, the local memory 84 may be relatively small capacity as may be needed to buffer data and support local operations, and the remote pooled memory logic 82 may be configured to process memory operation requests from the memory controller 81, and provide a front end interface to remote pooled memory hosted at a near edge device. In some embodiments, the logic 82 may be configured to establish a secure communication link with the near edge device, and tunnel memory operations through the secure communication link. The logic 82 may also be configured to decode system addresses to map a memory range to the near edge device, and/or to encode security credentials in memory requests to the near edge device. In some embodiments, the logic 82 may be further configured to schedule memory requests to the near edge device based on a QoS policy, and/or to discover characteristics related to the remote pooled memory including one or more of a memory range associated with the remote pooled memory and a performance characteristic of the remote pooled memory.

In an example implementation for a near edge device, the local memory 84 may be relatively large capacity NVM, and the remote pooled memory logic 82 may be configured to allocate a range of the local memory 84 as remote pooled memory, and provide a back end interface to the remote pooled memory for memory requests from a far edge device. In some embodiments, the logic 82 may be further configured to provide an interface to one or more of allocate, share and delete the remote pooled memory associated with the far edge device. The logic 82 may also be configured to manage memory access requests from the far edge device within the allocated range of the local memory 84. For example, the logic 82 may be configured to manage memory access requests from a plurality of far edge devices within the allocated range of the local memory 84, and/or to manage respective QoS policies for memory access requests from a plurality of far edge devices within the allocated range of the local memory 84.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

ADDITIONAL NOTES AND EXAMPLES

Example 1 includes an electronic apparatus, comprising one or more substrates, and logic coupled to the one or more substrates, the logic to process memory operation requests from a memory controller, and provide a front end interface to remote pooled memory hosted at a near edge device.

Example 2 includes the apparatus of claim 1, wherein the logic is further to establish a secure communication link with the near edge device, and tunnel memory operations through the secure communication link.

Example 3 includes the apparatus of any of claims 1 to 2, wherein the logic is further to decode system addresses to map a memory range to the near edge device.

Example 4 includes the apparatus of any of claims 1 to 3, wherein the logic is further to encode security credentials in memory requests to the near edge device.

Example 5 includes the apparatus of any of claims 1 to 4, wherein the logic is further to schedule memory requests to the near edge device based on a quality of service policy, and/or to discover characteristics related to the remote pooled memory including one or more of a memory range associated with the remote pooled memory, and a performance characteristic of the remote pooled memory.

Example 6 includes an electronic apparatus, comprising local memory, and logic communicatively coupled the local memory, the logic to allocate a range of the local memory as remote pooled memory, and provide a back end interface to the remote pooled memory for memory requests from a far edge device.

Example 7 includes the apparatus of claim 6, wherein the logic is further to provide an interface to one or more of allocate, share and delete the remote pooled memory associated with the far edge device.

Example 8 includes the apparatus of any of claims 6 to 7, wherein the logic is further to manage memory access requests from the far edge device within the allocated range of the local memory.

Example 9 includes the apparatus of claim 8, wherein the logic is further to manage memory access requests from a plurality of far edge devices within the allocated range of the local memory.

Example 10 includes the apparatus of claim 8, wherein the logic is further to manage respective quality of service policies for memory access requests from a plurality of far edge devices within the allocated range of the local memory.

Example 11 includes an electronic system, comprising a first edge device, and a second edge device in communication with the first edge device, wherein the first edge device includes a first memory controller, and first remote pooled memory logic communicatively coupled to the first memory controller, the first remote pooled memory logic to process memory operation requests from the first memory controller, and provide a front end interface to remote pooled memory hosted at the second edge device, and wherein the second edge device includes the remote pooled memory, and second remote pooled memory logic communicatively coupled the remote pooled memory, the second remote pooled memory logic to provide a back end interface to the remote pooled memory.

Example 12 includes the system of claim 11, wherein the first remote pooled memory logic is further to establish a secure communication link with the second edge device, and tunnel memory operations through the secure communication link.

Example 13 includes the system of any of claims 11 to 12, wherein the first remote pooled memory logic is further to decode system addresses to map a memory range to the second edge device.

Example 14 includes the system of any of claims 11 to 13, wherein the first remote pooled memory logic is further to encode security credentials of the first edge device in memory requests to the second edge device, and/or to discover characteristics related to the remote pooled memory including one or more of a memory range associated with the remote pooled memory and a performance characteristic of the remote pooled memory.

Example 15 includes the system of any of claims 11 to 14, wherein the first remote pooled memory logic is further to schedule memory requests to the second edge device based on a quality of service policy.

Example 16 includes the system of any of claims 11 to 15, wherein the second remote pooled memory logic is further to provide an interface to one or more of allocate, share and delete the remote pooled memory associated with the first edge device.

Example 17 includes the system of any of claims 11 to 16, wherein the second remote pooled memory logic is further to allocate a range of local memory for the remote pooled memory, and manage memory access requests from the first edge device within the allocated range.

Example 18 includes the system of claim 17, wherein the second remote pooled memory logic is further to manage memory access requests from a plurality of edge devices within the allocated range.

Example 19 includes the system of claim 17, wherein the second remote pooled memory logic is further to manage a quality of service policy for memory access requests from the first edge device within the allocated range Example 20 includes the system of claim 17, wherein the second remote pooled memory logic is further to manage respective quality of service policies for memory access requests from a plurality of edge devices within the allocated range.

Example 21 includes a method of controlling memory, comprising processing memory operation requests from a memory controller, and providing a front end interface to remote pooled memory hosted at a near edge device.

Example 22 includes the method of claim 21, further comprising establishing a secure communication link with the near edge device, and tunneling memory operations through the secure communication link.

Example 23 includes the method of any of claims 21 to 22, further comprising decoding system addresses to map a memory range to the near edge device.

Example 24 includes the method of any of claims 21 to 23, further comprising encoding security credentials in memory requests to the near edge device, and/or discovering characteristics related to the remote pooled memory including one or more of a memory range associated with the remote pooled memory and a performance characteristic of the remote pooled memory.

Example 25 includes the method of any of claims 21 to 24, further comprising scheduling memory requests to the near edge device based on a quality of service policy.

Example 26 includes a method of controlling memory, comprising allocating a range of a local memory as remote pooled memory, and providing a back end interface to the remote pooled memory for memory requests from a far edge device.

Example 27 includes the method of claim 26, further comprising providing an interface to one or more of allocate, share and delete the remote pooled memory associated with the far edge device.

Example 28 includes the method of any of claims 26 to 27, further comprising managing memory access requests from the far edge device within the allocated range of the local memory.

Example 29 includes the method of claim 28, further comprising managing memory access requests from a plurality of far edge devices within the allocated range of the local memory.

Example 30 includes the method of claim 28, further comprising managing respective quality of service policies for memory access requests from a plurality of far edge devices within the allocated range of the local memory.

Example 31 includes at least one non-transitory one machine readable medium comprising a plurality of instructions that, in response to being executed on a computing device, cause the computing device to process memory operation requests from a memory controller, and provide a front end interface to remote pooled memory hosted at a near edge device.

Example 32 includes the at least one non-transitory one machine readable medium of claim 31, comprising a plurality of further instructions that, in response to being executed on the computing device, cause the computing device to establish a secure communication link with the near edge device, and tunnel memory operations through the secure communication link.

Example 33 includes the at least one non-transitory one machine readable medium of any of claims 31 to 32, comprising a plurality of further instructions that, in response to being executed on the computing device, cause the computing device to decode system addresses to map a memory range to the near edge device.

Example 34 includes the at least one non-transitory one machine readable medium of any of claims 31 to 33, comprising a plurality of further instructions that, in response to being executed on the computing device, cause the computing device to encode security credentials in memory requests to the near edge device, and/or to discover characteristics related to the remote pooled memory including one or more of a memory range associated with the remote pooled memory and a performance characteristic of the remote pooled memory.

Example 35 includes the at least one non-transitory one machine readable medium of any of claims 31 to 34, comprising a plurality of further instructions that, in response to being executed on the computing device, cause the computing device to schedule memory requests to the near edge device based on a quality of service policy.

Example 36 includes at least one non-transitory one machine readable medium comprising a plurality of instructions that, in response to being executed on a computing device, cause the computing device to allocate a range of a local memory as remote pooled memory, and provide a back end interface to the remote pooled memory for memory requests from a far edge device.

Example 37 includes the at least one non-transitory one machine readable medium of claim 36, comprising a plurality of further instructions that, in response to being executed on the computing device, cause the computing device to provide an interface to one or more of allocate, share and delete the remote pooled memory associated with the far edge device.

Example 38 includes the at least one non-transitory one machine readable medium of any of claims 36 to 37, comprising a plurality of further instructions that, in response to being executed on the computing device, cause the computing device to manage memory access requests from the far edge device within the allocated range of the local memory.

Example 39 includes the at least one non-transitory one machine readable medium of claim 38, comprising a plurality of further instructions that, in response to being executed on the computing device, cause the computing device to manage memory access requests from a plurality of far edge devices within the allocated range of the local memory.

Example 40 includes the at least one non-transitory one machine readable medium of claim 38, comprising a plurality of further instructions that, in response to being executed on the computing device, cause the computing device to manage respective quality of service policies for memory access requests from a plurality of far edge devices within the allocated range of the local memory.

Example 41 includes a memory controller apparatus, comprising means for processing memory operation requests from a memory controller, and means for providing a front end interface to remote pooled memory hosted at a near edge device.

Example 42 includes the apparatus of claim 41, further comprising means for establishing a secure communication link with the near edge device, and means for tunneling memory operations through the secure communication link.

Example 43 includes the apparatus of any of claims 41 to 42, further comprising means for decoding system addresses to map a memory range to the near edge device.

Example 44 includes the apparatus of any of claims 41 to 43, further comprising means for encoding security credentials in memory requests to the near edge device, and/or means for discovering characteristics related to the remote pooled memory including one or more of a memory range associated with the remote pooled memory and a performance characteristic of the remote pooled memory.

Example 45 includes the apparatus of any of claims 41 to 44, further comprising means for scheduling memory requests to the near edge device based on a quality of service policy.

Example 46 includes a memory controller apparatus, comprising means for allocating a range of a local memory as remote pooled memory, and means for providing a back end interface to the remote pooled memory for memory requests from a far edge device.

Example 47 includes the apparatus of claim 46, further comprising means for providing an interface to one or more of allocate, share and delete the remote pooled memory associated with the far edge device.

Example 48 includes the apparatus of any of claims 46 to 47, further comprising means for managing memory access requests from the far edge device within the allocated range of the local memory.

Example 49 includes the apparatus of claim 48, further comprising means for managing memory access requests from a plurality of far edge devices within the allocated range of the local memory.

Example 50 includes the apparatus of claim 48, further comprising means for managing respective quality of service policies for memory access requests from a plurality of far edge devices within the allocated range of the local memory.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic apparatus, comprising:
one or more substrates; and
logic coupled to the one or more substrates, the logic to:
process memory operation requests from a memory controller,
provide a front end interface to remote pooled memory hosted at a near edge device, and
decode system addresses to map a memory range to the remote pooled memory hosted at the near edge device.

2. The apparatus of claim 1, wherein the logic is further to:
establish a secure communication link with the near edge device; and
tunnel the processed memory operation requests from the memory controller through the secure communication link.

3. The apparatus of claim 1, wherein the logic is further to:
encode security credentials in memory requests to the near edge device.

4. The apparatus of claim 1, wherein the logic is further to:
discover characteristics related to the remote pooled memory including one or more of a memory range associated with the remote pooled memory and a performance characteristic of the remote pooled memory.

5. An electronic system, comprising:
a first edge device; and
a second edge device in communication with the first edge device,
wherein the first edge device includes:
a first memory controller, and
first remote pooled memory logic communicatively coupled to the first memory controller, the first remote pooled memory logic to:
process memory operation requests from the first memory controller, and
provide a front end interface to remote pooled memory hosted at the second edge device,
and wherein the second edge device includes:
the remote pooled memory, and
second remote pooled memory logic communicatively coupled the remote pooled memory, the second remote pooled memory logic to:
provide a back end interface to the remote pooled memory.

6. The system of claim 5, wherein the first remote pooled memory logic is further to:
establish a secure communication link with the second edge device; and
tunnel memory operations through the secure communication link.

7. The system of claim 5, wherein the first remote pooled memory logic is further to:
decode system addresses to map a memory range to the second edge device.

8. The system of claim 5, wherein the first remote pooled memory logic is further to:
encode security credentials of the first edge device in memory requests to the second edge device.

9. The system of claim 5, wherein the first remote pooled memory logic is further to:
schedule memory requests to the second edge device based on a quality of service policy.

10. The system of claim 5, wherein the second remote pooled memory logic is further to:
provide an interface to one or more of allocate, share and delete the remote pooled memory associated with the first edge device.

11. The system of claim 5, wherein the second remote pooled memory logic is further to:
allocate a range of local memory for the remote pooled memory; and
manage memory access requests from the first edge device within the allocated range.

12. The system of claim 11, wherein the second remote pooled memory logic is further to:
manage memory access requests from a plurality of edge devices within the allocated range.

13. The system of claim 11, wherein the second remote pooled memory logic is further to:
manage a quality of service policy for memory access requests from the first edge device within the allocated range.

14. The system of claim 11, wherein the second remote pooled memory logic is further to:
manage respective quality of service policies for memory access requests from a plurality of edge devices within the allocated range.

* * * * *